No. 872,481.  
PATENTED DEC. 3, 1907.

C. C. TILLOTSON.  
POWER TRANSMISSION CLUTCH.  
APPLICATION FILED MAY 29, 1907.

WITNESSES:  
Thos. F. Hayes  
V. A. Wolcott

Charles C. Tillotson,  
INVENTOR.

UNITED STATES PATENT OFFICE.

CHARLES C. TILLOTSON, OF OLATHE, KANSAS.

POWER-TRANSMISSION CLUTCH.

No. 872,481.   Specification of Letters Patent.   Patented Dec. 3, 1907.

Application filed May 29, 1907. Serial No. 376,294.

*To all whom it may concern:*

Be it known that I, CHARLES C. TILLOTSON, a citizen of the United States, residing at Olathe, in the county of Johnson and State of Kansas, have invented a new and useful Device, of which the following is a specification.

This invention has relation to the power transmission clutch, on which Letters Patent No. 850981 issued to myself Apr. 23, 1907.

The object of the invention is to improve the construction of the clutch for greater simplicity in manufacture and use. This is accomplished by providing a shifting arrangement and shield for the coil spring of the aforesaid clutch and rigidly connecting the two driving members.

The shifting device consists of a hollow cylinder slightly longer than the said spring, and having both ends closed with the exception of circular openings concentric with the cylinder, through which openings may pass the shafts on which the coil spring operates. The device when in place completely surrounds and incloses the coil spring, protecting it from mechanical injury and preventing the entrance of dirt or foreign matter. On the inner surfaces of the ends of the hollow cylinder teeth are formed, in such a manner that when the cylinder is turned one way the teeth will slip over the end of the spring, but when turned the other way a tooth will engage the end of the spring, causing it to expand, until it becomes loose enough to slip on its shaft. If force is applied to the cylinder in the direction of its axis at the same time it is given its rotary motion, it will push the loosened spring longitudinally along the shaft, as well as causing it to slip around the shaft.

Figure 1:
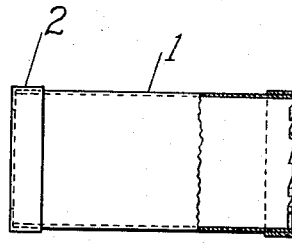
Figure 2:
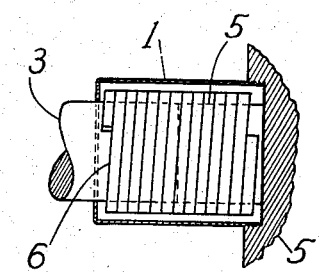
Figure 3:
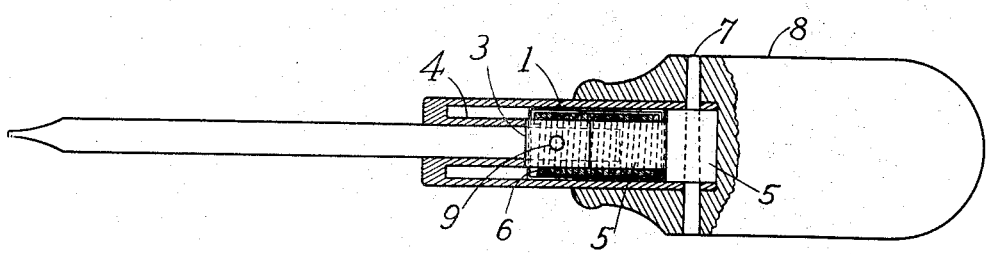
Figure 4:
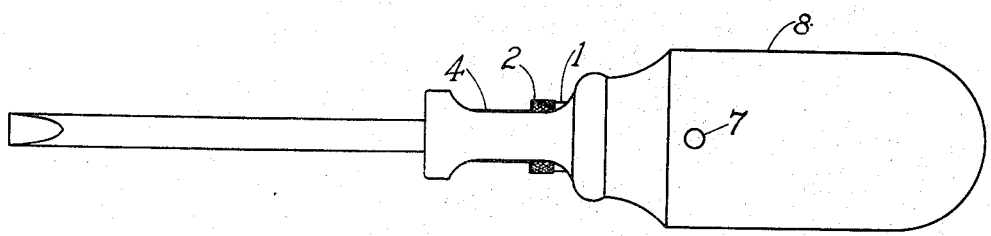

In the accompanying drawing Figure 1 is a side elevation, partly in section, and end elevation of one form of the shifting device. Fig. 2 shows another form of the device with only one end closed as above described, the other end being screwed into a part of the machine to which it is applied. Fig. 3 is a plan of a screwdriver, partly in section, showing the device in place, and Fig. 4 is an external elevation of the same screwdriver.

The number of any part is the same in all the figures.

Fig. 1 shows the device as made of a section of hollow cylinder 1, and two end pieces 2, having internal teeth stamped or pressed therein, and attached to part 1 by being forced on by pressure, or soldered, brazed or sweated on. The ends may also be screwed on, or fastened in any rigid manner. One end may be formed from the main part 1 by stamping, crimping or spinning the end inward into the desired shape. The teeth on part 2 may be formed in casting, or by cutting, stamping, or in any other manner. It may be desirable, in case the teeth are stamped, to make them on a flat annular disk, and fasten the latter firmly against the end of the cylinder with a plain cap.

In Fig. 2 the shield 1 incloses the coil spring 6, which forms the connection clutch between shafts 3 and 5. Means for keeping shafts 3 and 5 in exact alinement are not shown in this figure, but this object may be attained by a smaller shaft passing through both, by a stud screwed into one and serving as a shaft for the other, or by means of bearings beyond the limits of the figure. This figure shows the clutch as applied to a machine where only single action is desired.

Fig. 3 shows a combination of coil spring clutch and shifting device, where the latter more completely serves the dual purposes of protecting the clutch and of shifting it when desired. The bit of the screwdriver is securely fastened to the collar or hollow shaft 3 by a pin 9 passing through both. The spring 6, shown in section, embraces 3 and the driving member 5, which is retained firmly and prevented from turning in the handle by the pin 7. When reciprocating rotary movement is given to the handle of the screwdriver (assuming the coil spring to be right handed) the bit will be turned to the left, but will slip in turning to the right, thus acting to draw out a screw. To adjust the screwdriver for driving screws, hold the handle and bit from turning, and turn the shield 1 to the right, at the same time forcing it outward away from the handle. In this action one of the teeth at the handle end of the shield engages the end of the spring, loosening it and slipping it over 3 onto 4 and off of 5. Part 4 is reversed at the bit end and fastened in the handle by means of the same pin 7 as 5 is. There is now no positive connection between 5 and 3, and when the handle is turned shaft 4 will drive 3 to the right, but will slip on turning to the left, and the screw will be driven in. If a left hand coil is used in place of the right hand one as above described, the operation of the screwdriver will be reversed in each case.

The advantage of a coil spring to cover completely only the two parts 3 and 4 or 3 and 5, over one covering all three parts is in getting the motion transmitted either to the right or left as desired, while at the same time having the two driving members rigidly connected together, thus avoiding the necessity of any other clutching devices outside of the coil spring and its shield. This is the main object of the invention.

It will be observed that when the coil spring is shifted to a position midway between the two extremes possible, it will cover all of 3 and part of 4 and 5, and the bit will therefore be turned either way the handle is turned.

Fig. 4 shows the outer shell of part 4 cut away on two sides to make the shifting device accessible. The latter should be knurled or roughened to facilitate turning.

These improvements may be used to advantage on the coil spring clutch wherever ratchets are now used, including screw drivers, bit braces, lawn mowers, mowing machines, jack screws, brakes, crank shafts of automobiles, on wrenches, die plates and pipe cutters, on clocks, watches and micrometer callipers, and many other common articles. In many of these cases the hollow cylinder may act principally or solely as a shield, in case shifting the spring is unnecessary, as when action in one direction only is desired. In such cases the teeth inside the ends of the cylinder may sometimes be dispensed with.

Letters Patent No. 850981 involve a cylindrical driven member, two similar driving members and a coil spring embracing them. I do not claim these, but

What I claim as new and desire to secure by Letters Patent is

1. In a coil spring clutch, comprising rotary members and a voluted spring member embracing the aforesaid members and engaging the same frictionally only, a hollow cylindrical shield fitting over said rotary members in such manner as to be retained in position coaxial with them, and in conjunction with other parts completely surrounding and inclosing the aforesaid voluted spring member.

2. A coil spring clutch comprising a rotary driven member, and two rotary driving members, a voluted spring member embracing the aforesaid members, and engaging the same frictionally only, said spring member extending over the driven member and one of the driving members, and a shifting device consisting of a hollow cylinder having its ends flanged inward to fit over the said rotary members, and with inwardly projecting teeth formed thereon in such manner as to release the spring member and shift it longitudinally to any desired position on the driving and driven members.

3. A clutch comprising a trinity of alined rotary members, a voluted spring member embracing the aforesaid members and of such length as to extend along the entire length of but two of the same, a hollow cylinder inclosing the voluted spring member, and one or more members rigidly connecting the two driving members, and preventing the rotary movement of either with respect to the other, all substantially as shown and described herein.

In testimony that I claim the foregoing as my own I have hereto affixed my signature in the presence of two witnesses.

CHAS. C. TILLOTSON.

Witnesses:
A. W. LARUE,
GEO. S. SHEPHERD.